Dec. 24, 1946.          E. BARKER                2,413,095
                  PORTABLE LOADING MACHINE
            Filed Sept. 14, 1944          4 Sheets-Sheet 3
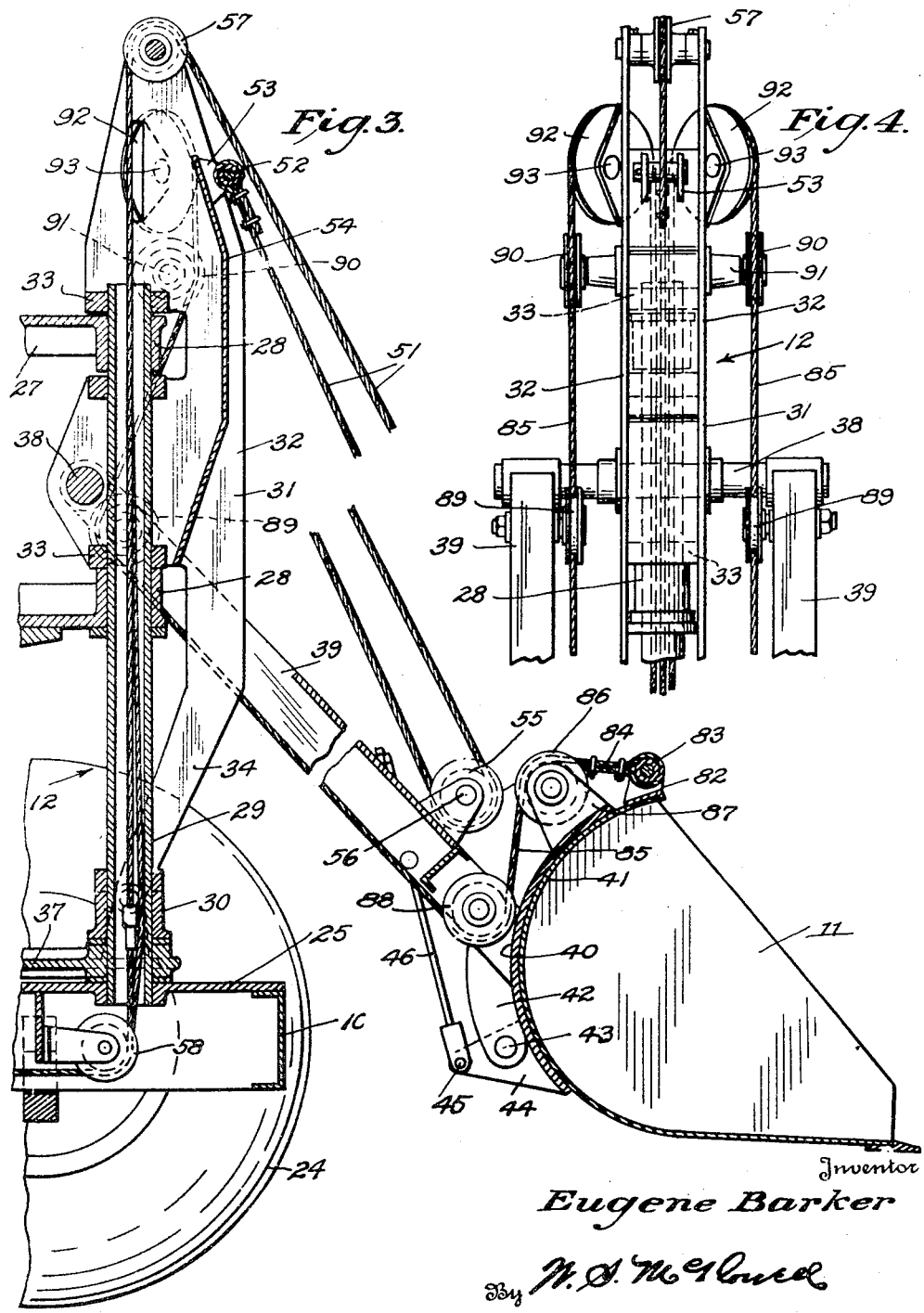
Inventor
Eugene Barker
By W. A. McDowell
                Attorney Dec. 24, 1946.  E. BARKER  2,413,095
PORTABLE LOADING MACHINE
Filed Sept. 14, 1944  4 Sheets-Sheet 4

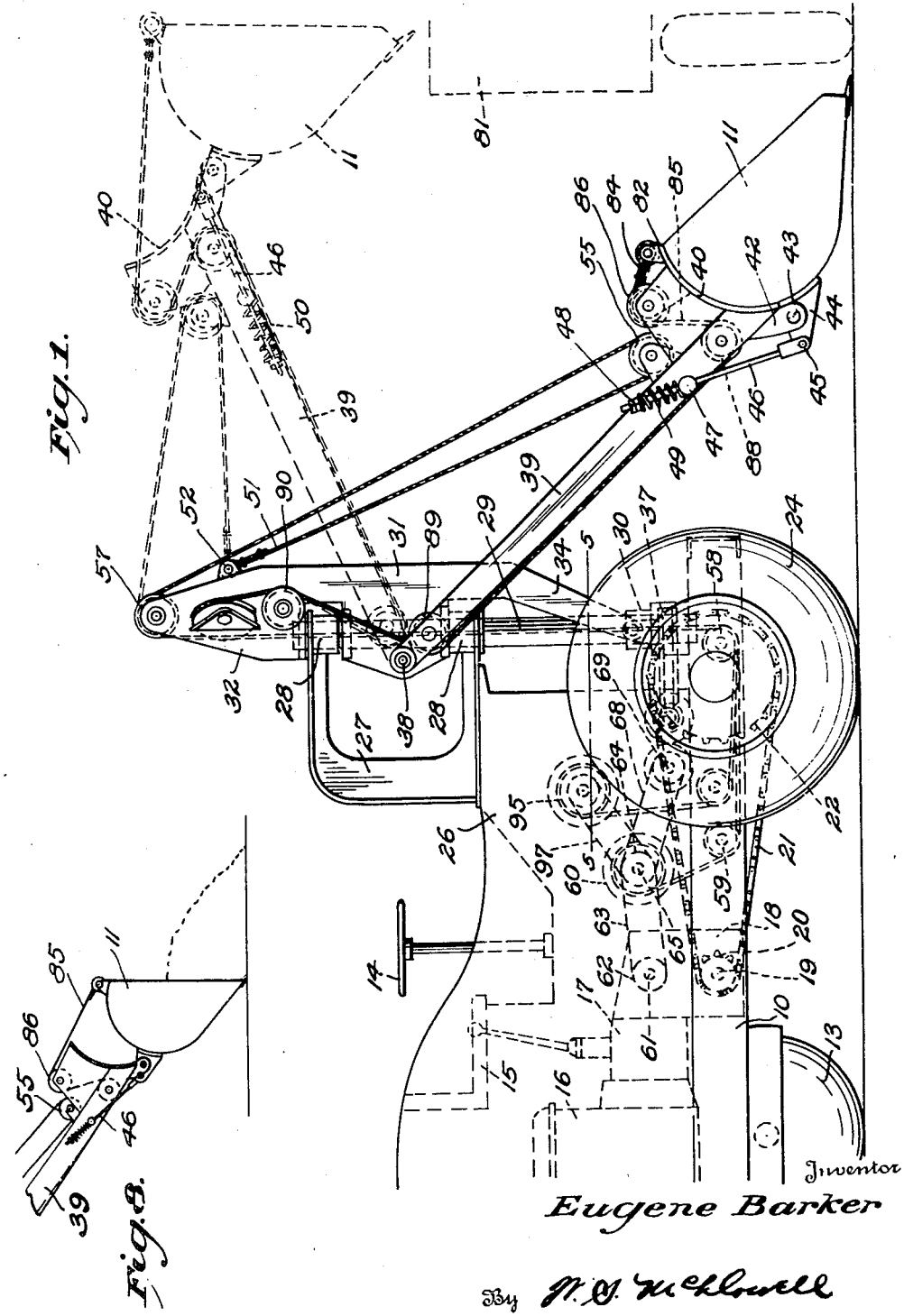

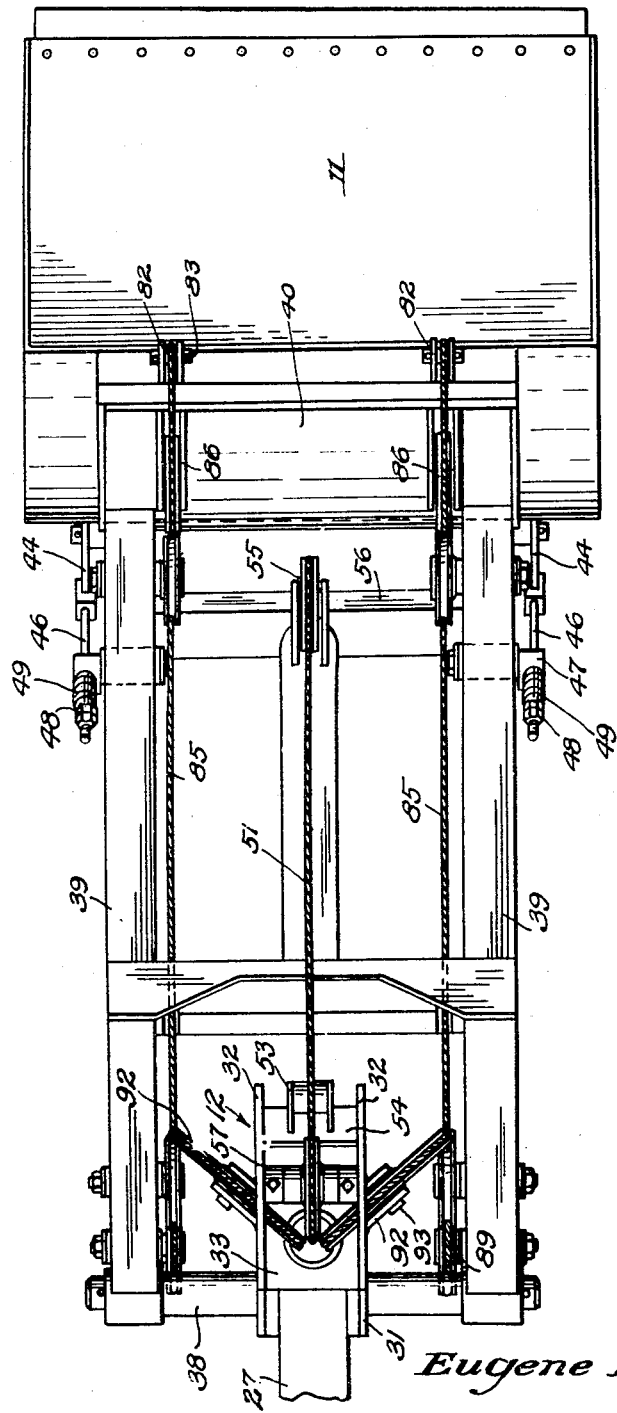

Inventor
Eugene Barker
By W. S. McDowell
Attorney

Patented Dec. 24, 1946

2,413,095

UNITED STATES PATENT OFFICE 2,413,095

PORTABLE LOADING MACHINE

Eugene Barker, Columbus, Ohio, assignor to The Jaeger Machine Company, Columbus, Ohio, a corporation of Ohio Application September 14, 1944, Serial No. 554,032

5 Claims. (Cl. 214—132)

1

This invention relates to loading machines and, more particularly, to loading machines of the type utilizing an automotive base vehicle having mounted on one end thereof a power actuated scoop, or other form of loader, adapted for swinging movement about vertical and horizontal axes for receiving, lifting and laterally turning to discharge positions materials contained therein.

It is an object of the invention to provide a loading machine of this character wherein improved power actuated means, under the convenient control of the machine operator, are provided for advancing or thrusting the scoop when in a lowered position into the material to be loaded, thereafter turning the scoop in vertical and horizontal arcs to cause it to assume a desired position of horizontal elevation and material discharge, and then producing pivotal movement of the scoop so that it will be downwardly tilted to provide for the gravitational discharge of the materials handled thereby.

It is another object of the invention to provide a loading machine of this nature with improved cable means, operated by power derived from the engine of the automotive base vehicle, for turning the scoop and its associated boom in vertical planes and for tilting the scoop after the same has been elevated to its desired material-discharging positions, all these operations being under the convenient regulation of the machine operator and subject to accurate regulation.

It is another object of the invention to provide a loading machine of the type set forth characterized by the simplicity of its mechanical construction, the ease by which its operation may be governed, and its compact and sturdy mechanical design which renders the machine adaptable for hard usage and extended service without mechanical failure.

For a further understanding of the invention, reference is to be had to the following description and the accompanying drawings, wherein:

Fig. 1 is a side elevational view of a loading machine formed in accordance with the present invention, the material-handling scoop of the machine being shown in full lines in its lowered or loading position and in broken lines in its elevated position of material discharge;

Fig. 2 is a top plan view of the forward end of the loading machine;

Fig. 3 is an enlarged vertical sectional view taken through the forward end of the machine;

Fig. 4 is a fragmentary front elevational view of the upper end of the boom mast;

Figure 6:
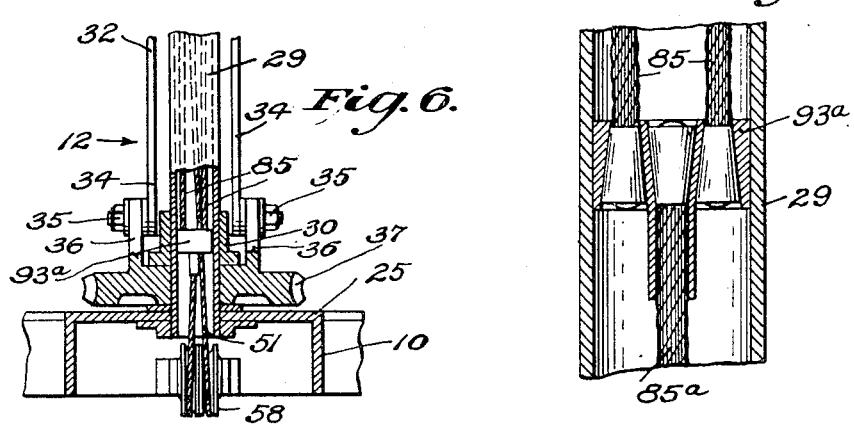
Figure 7:
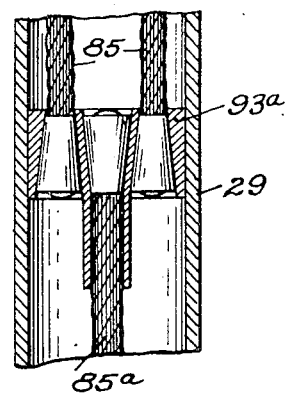

2 the drive mechanism for turning the boom horizontally and associated cable drum;

Fig. 6 is a detail vertical sectional view of the worm gear employed in rotating the boom;

Fig. 7 is a detail sectional view taken through the tubular mast column of the machine and showing the sliding cable coupling;

Fig. 8 is a detail side elevational view of the machine scoop in another position of operation with respect to its position as shown in Fig. 1.

Referring more particularly to the drawings, the numeral 10 designates the chassis or frame of an automotive base vehicle employed in the design of my improved loading machine; the numeral 11 designates the material-handling scoop, shovel or other load carrier; and the numeral 12 designates the mast employed in the raising and lowering of the scoop and turning thereof horizontally to desired positions of material-discharge.

The mast is carried by the frame 10 at its forward or material-attacking end, the opposite or rear end of the frame 10 is provided with one or more ground-engaging steering wheels 13. This wheel is disposed in the center of the frame and is turnable about the vertical axis, so that the machine may be manipulated in circles of small radii. The operating positions of the wheel 13 are controlled by the customary manually operated turning wheel 14 provided on the base vehicle contiguous to the operator's position 15.

Figure 5:
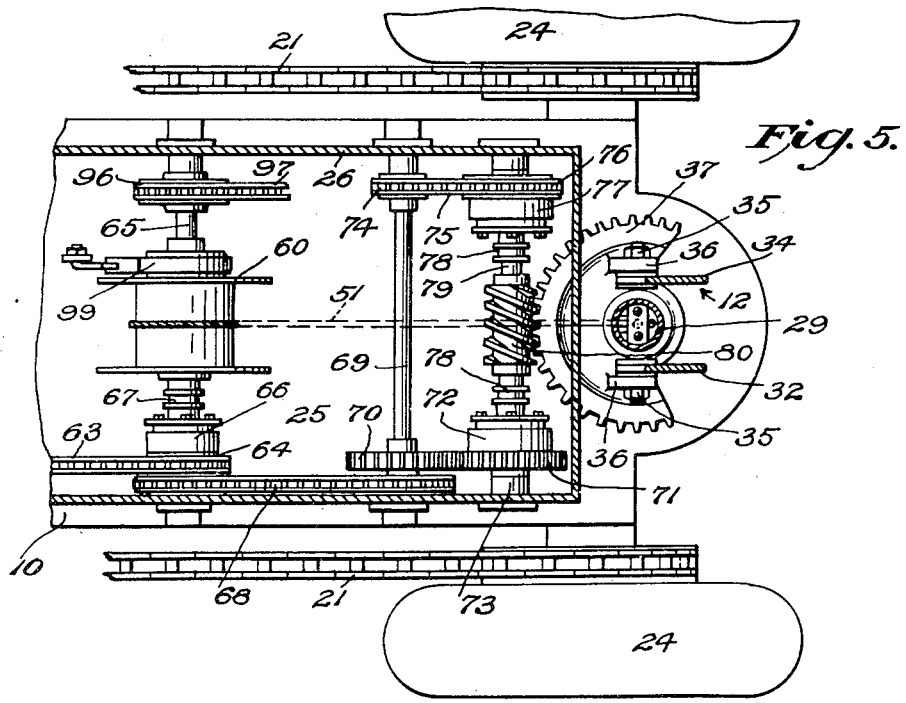
Fig. 5 is a horizontal sectional view disclosing

Suitably supported by the chassis or frame 10 at the rear end of the vehicle is a power plant 16, ordinarily an internal combustion engine, and associated with the same is the usual clutch and change-speed transmission 17 and differential 18, all of standard construction. The differential 18 includes the usual cross shafts 19 carrying sprocket wheels 20, around which there are trained endless chains 21, the latter being also passed over sprockets 22 joined with a pair of forwardly located, ground-engaging, traction wheels 24. These wheels are arranged on opposite sides of the frame 10, as shown in Fig. 5, in order to sustain adequately the loads imposed thereon by the mast 12 and scoop 11, the weight of these elements serving to maintain the wheels 24 in firm tractive engagement with the ground, so that the same may exert high tractive effort in advancing the scoop into the materials to be loaded.

The frame structure 10 is formed with a bed plate 25 and a machinery enclosing casing 26, the upper and forward part of the latter being suitably braced to effect the support of a U- shaped bracket 27. The outer ends of the legs of this bracket are formed with vertically aligned sleeves 28 for the reception of a tubular column 29 forming a component part of the mast structure. The lower end of this column projects through an opening provided in the bed plate 25 and is additionally supported by a lower bearing sleeve 30 carried by the bed plate.

Mounted on the column 29 to turn about the vertical axis thereof is a vertically disposed mast frame 31. This frame comprises a pair of duplicative, transversely spaced and vertically extending plates 32, said plates being united by transversely extending bars 33, the latter being formed with openings for the reception of the column 29, in order that the frame 31 may be supported by the bracket 27 and, concomitantly, to turn about the vertical axis of said column. The lower portions of the plates 32 terminate in leg extensions 34 which, at their lower ends, are bolted as at 35 to ears 36 integrally formed with and arising from a worm gear 37, the latter being rotated by mechanism driven by the engine 16 in order to effect horizontal turning movement of the mast frame 31 about the vertical axis of the column 29.

The mast frame, between the legs of the bracket 27, carries a heavy horizontally disposed cross shaft 38 and fulcrumed for turning movement on the outer ends of this shaft are the inner or upper ends of a pair of parallel, forwardly extending, boom arms 39. These arms at their outer ends carry an arcuate thrust plate 40, the latter being shaped to receive and closely engage the arcuate rear wall 41 of the scoop 11. The plate 40 is formed to include a pair of tongues 42, which are pivotally connected as at 43 with a pair of rearwardly projecting brackets 44 formed with the scoop 11, in order to admit of turning movement of the scoop about the pivotal connections 43 when the scoop is elevated to its material-discharging position, as shown in Fig. 1.

The outer ends of the brackets 44 are pivotally connected as at 45 with a pair of rods 46, the latter being slidably received in openings provided in turnable blocks 47 carried by the boom arms 39. The upper ends of the rods 46 are threaded for the reception of nuts 48 and washers 49, coil springs 50 being disposed between the washers 49 and the blocks 47, surrounding the rods 46, as indicated in Fig. 1. When the scoop is positioned to receive material, the brackets 44 thereof will be disposed to place the springs 50 under compression so that when the scoop is elevated to its material-discharging level, the release of the scoop to produce downward tilting thereof will cause the energy confined in the compressed springs to apply revolving forces to the scoop, urging the same toward a downwardly tilted position, this being in addition to the off-centered weight of the material contained within the scoop.

To raise and lower the boom and scoop between lowered material-receiving positions and elevated material-discharging positions, use is made of a cable 51. One end of this cable is fastened as at 52 to a bracket 53 projecting from the top of a transversely extending front plate 54 of the mast frame 31. From the bracket 53, the cable extends downwardly and is trained around a sheave 55 rotatably mounted on a cross shaft 56 carried by the outer end portions of the boom arms 39. After passing around the sheave 55, the cable 51 is trained upwardly, as in Fig. 3, passing around a sheave 57 rotatably mounted at the extreme upper end of the mast frame 31. From the sheave 57, the cable 51 passes downwardly and extends axially through the tubular column 29, passing around a sheave 58 carried by the frame 10, thence over a second frame carried sheave 59 and thence to a power driven brake-controlled drum 60 to which the other end of the cable is attached.

The transmission casing 17 of the engine 16 is provided with a power take-off shaft 61. This shaft is provided with a sprocket 62 around which is trained an endless chain 63 which leads to a sprocket 64 rotatably supported on a cross shaft 65 carried by the frame 10. Rotatable with the sprocket 64 is a clutch assembly 66 which, through a manually shiftable control 67, is utilized to impart rotary movement to the cable drum 60, causing the winding of the cable 51 thereabout, whereby to shorten the effective length of said cable and thereby cause the elevation of the boom arms 39 and the associated scoop 11.

To swing the boom arms horizontally after the scoop has reached an elevated position, there is rotatably joined with the sprocket 64 a second sprocket over which is trained an endless chain 68. This chain is also trained over another sprocket fixed on a rotatable cross shaft 69, the latter being journaled in bearings provided in the side walls of the casing 26 or on the frame 10 of the base vehicle.

The shaft 69 is provided with a gear 70 which meshes with a corresponding gear 71 joined with a clutch assembly 72, the latter being rotatably supported on another cross shaft 73 carried by the casing 26. The shaft 69 is also provided with a sprocket 74 over which passes an endless chain 75 leading to a second sprocket 76 mounted on the shaft 73. The sprocket 76 is connected with a clutch assembly 77. By selective manual operation of the control 78 for the clutches 72 and 77, the direction of rotation of a quill 79 carrying a worm 80 may be readily controlled. The worm 80 meshes with the teeth of the worm gear 37 employed in revolving the mast structure about the column 29.

After the boom and scoop have been elevated, controlling mechanism is employed for governing the tilting movement of the scoop about its pivotal connections 43 with the boom, so that the scoop may be dropped and its bottom wall downwardly tilted, as shown in dotted lines in Fig. 1, to cause gravitational discharge of material from the scoop, as when the latter is employed in loading material into the body 81 of an automotive truck.

Such tilting of the scoop is controlled by providing the upper edge of the arcuate rear wall 41 thereof with brackets 82 carrying cross members 83, the latter being connected as at 84 with a pair of cables 85. From the brackets 82, the cables 85 pass over a pair of sheaves 86 supported by brackets 87 on the upper portions of the thrust plate 40 of the boom arms. From the sheaves 86, the cables 85 are trained under sheaves 88 carried by the outer ends of the boom arms. The cables 85 are then trained along the boom arms in substantially parallel relation thereto and pass under and around a pair of sheaves 89 carried by the upper ends of the boom arms contiguous to their swivel mountings on the cross shaft 38.

The cables 85 then extend upwardly, passing over guide sheaves 90 carried on the ends of a cross shaft 91 journaled horizontally in the mast frame 31. After contacting the sheaves 90, the cables 85 pass over and around a pair of angularly related sheaves 92 journaled as at 93 in connection with the upper end of the mast frame. From the sheaves 92, the cables 85 pass downwardly, extending through the tubular column 29 for connection at their lower ends with a sliding coupling link 93a mounted in the column 29 (Fig. 7) and from which link a single cable 85a depends for passage around sheaves 94 carried by and disposed laterally of said column, as in Figs. 1 and 3. From the sheaves 94, the cable 85a is directed to a brake-controlled drum 95 rotatably supported by and within the confines of the casing 26 and to which drum the inner ends of said cable 85a is connected. The drum 95 may be rotated by providing the shaft of the drum 60 with a sprocket 96 and over which is trained an endless cable 97 leading to a sprocket clutch assembly 98 used in the driving of the drum 95.

Thus when the drum 95 is rotated to wind the cable 85a thereabout, the shortening in the effective length of this cable causes the scoop to revolve about its pivots 43 until the wall 41 of the scoop comes into engagement with the thrust plate 40 of the boom arms, thus holding the scoop in its material attacking and load-receiving position. After the boom and scoop have been elevated, the clutch 98 may be released in order to pay out the cable from the drum 95, providing for the oscillation of the scoop under the weight of the materials contained therein and the initiation of movement by the springs 50 of the rods 46, thus causing the bottom of the scoop to assume an angular position providing for the gravitational discharge of materials from the scoop.

In view of the foregoing, it will be seen that the present invention provides an improved loading machine for use in many industrial capacities where bulk materials of various kinds are required to be elevated or otherwise transferred from one location to another. A practical advantage which the machine possesses is found in constructing the mast so that in addition to lifting the associated scoop in a vertical direction, the latter may be revolved about a substantially vertical axis to locate the same laterally of the machine. This feature provides for greater facility in operation and reduces maneuvering operations of the portable base, as is usually necessary in registering the scoop with respect to associated vehicles, or with other positions of material discharge.

The power-driven turning mechanism for the mast is so constructed that it is locked against undue horizontal swinging movement by the use of the worm gearing. Also, the machine is further characterized by its mechanical simplicity and its ability to receive and handle heavy loads expeditiously and with complete control thereover, enabling the loaded scoop to have its contents discharged at any desired point within the working range of the machine. If desired, as shown in Fig. 8, the scoop may be adjusted to extreme vertical position so the same may function in the capacity of a bulldozer in clearing ground space of loose bulk material deposited thereon. Also, the drums 60 and 95 are provided with band brakes 99 to hold said drums stationary or to control rotation thereof when the same are declutched from their driving means.

Having thus described my invention, I claim:

1. In a loading machine, a portable base vehicle having a power-furnishing and propelling engine, an upright mast frame support on and adjacent to one end of said vehicle for turning movement about a substantially vertical axis, means driven by said engine for imparting controlled turning movement to said mast frame, a cross member carried by said frame, a pair of boom arms having their rear ends pivotally secured to said cross member for turning movement about a substantially horizontal axis, a load carrier pivotally connected with the outer ends of said boom arms for turning movement relative thereto about a substantially horizontal axis, a drum mounted on said vehicle and driven by said engine, a cable connected at one end with said mast frame, guides on said boom arms and said mast frame around which intermediate portions of said cable are passed, the other end of said cable being connected with said drum, whereby upon the winding of said cable about said drum to shorten the effective length thereof said boom arms and load carrier will be turned in an upward direction, a second cable for controlling tilting movement of said load carrier with respect to said boom arms, said second cable being secured at one end to said load carrier, guides carried by said boom arms and mast frame about which the intermediate portions of said second cable are trained, and an engine-actuated drum mounted on said vehicle with which the other end of said second cable is connected.

2. In a loading machine, a portable base vehicle having a power-furnishing and propelling engine, an upright mast structure supported on and adjacent to one end of said vehicle for turning movement about a substantially vertical axis, means driven by said engine for imparting controlled turning movement to said mast structure, a boom pivoted to and projecting forwardly from said mast structure for turning movement in vertical planes, a load carrier pivoted to the outer end of said boom for tilting movement about a substantially horizontal axis, a cable drum rotatably supported on said vehicle, means driven by said engine for imparting rotation to said drum, a cable connected at one end with the upper portion of said mast structure, guides mounted on the outer end of said boom and on said mast structure and about which intermediate portions of said cable are passed, the other end of said cable being connected with said drum so that upon being wound thereabout said boom and carrier are raised, a second set of cables having their outer ends connected with said carrier, guides on said boom and mast structure about which the intermediate portions of said second set of cables are trained, and a second engine actuated drum to which the other end of said second set of cables is connected.

3. In a loading machine, a portable base vehicle, an upright mast structure supported on and adjacent to one end of said vehicle for turning movement about a substantially vertical axis, a boom pivotally connected at one end with said mast structure for turning movement in a vertical plane, a scoop pivotally connected with the outer end of said boom for tilting movement about a substantially horizontally disposed axis, means for raising and lowering said boom and said scoop, means for controlling the tilting movement of said scoop relative to said boom, spring actuated means joined with said boom and scoop for imparting initial tilting movement to said scoop from its material-containing to its material-discharging position, said means embodying a pair of slidable rods pivotally connected at their lower ends with said scoop, turnable bearings carried by said boom in which said rods are slidably mounted, and springs interposed between the outer ends of said rods and said turnable bearings.

4. In a loading machine, a portable self-propelled base vehicle having an operating engine, a tubular upright mast frame supported on and adjacent to one end of said base vehicle for turning movement about a substantially vertical axis, reversible means driven by said engine for imparting controlled turning movement to said mast frame, a boom pivotally united at its inner end with said mast frame for oscillatory movement in a vertical plane and turning movement in a horizontal plane in unison with said frame, an arcuate thrust member carried by the outer end of said boom, a scoop open at its front and having an arcuate rear wall engageable with the boom thrust member, means pivotally uniting the rear of said scoop with said thrust member to provide for turning movement of the scoop about a substantially horizontally disposed axis at the outer end of said boom, said axis being disposed inwardly and eccentrically of the center of gravity of the scoop so that the latter when released will turn downwardly to gravitationally discharge its contents, cable means secured at one end to said frame and passing around guides carried by the outer end of said boom and around and through guides forming a part of said mast frame for raising and lowering said boom, a reversible drum rotatably mounted on said base vehicle and driven by said engine to which said cable means is connected, a second cable means connected at one end with said scoop for controlling turning movement of the latter about its pivotal mounting, said second cable means being trained around guides carried by said boom and mast frame, and a second reversible engine driven drum rotatably mounted on said base vehicle and to which said second cable means is connected at its other end.

5. In a loading machine as set forth in claim 4 and wherein a spring-actuated means is mounted on the outer end of said boom and connected with said scoop for imparting initial turning movement to the latter upon pay-out movement of said second-named cable means.

EUGENE BARKER.